United States Patent [19]

Rohde

[11] Patent Number: 6,147,171
[45] Date of Patent: Nov. 14, 2000

[54] PHILIPS CATALYSTS REDUCED WITH ORGANIC COMPOUNDS AND POSSESSING SHORT INDUCTION TIMES

[75] Inventor: Wolfgang Rohde, Speyer, Germany

[73] Assignee: BASF Aktiengesellschaft, Ludwigschafen, Germany

[21] Appl. No.: 09/068,301

[22] PCT Filed: Nov. 18, 1996

[86] PCT No.: PCT/EP96/05070

§ 371 Date: May 7, 1998

§ 102(e) Date: May 7, 1998

[87] PCT Pub. No.: WO97/19115

PCT Pub. Date: May 29, 1997

[30] Foreign Application Priority Data

Nov. 21, 1995 [DE] Germany .................. 195 43 294

[51] Int. Cl.⁷ .................. C08F 4/24; B01J 20/02
[52] U.S. Cl. .................. 526/106; 526/104; 526/113; 526/352; 502/256; 502/438
[58] Field of Search .................. 526/106, 104, 526/352, 903, 113; 502/256, 438

[56] References Cited

U.S. PATENT DOCUMENTS 4,173,548  11/1979  Pullukat et al. .................. 526/96
4,284,527  8/1981  Pullukate et al. .................. 252/430
4,368,302  1/1983  Downs .................. 526/106

FOREIGN PATENT DOCUMENTS 166 157  1/1986  European Pat. Off. .

OTHER PUBLICATIONS

JMS–Rev. Macromol. Chem. Phys., 153–199 (1989).
Jrl. of Poly. Sci, Part A–1, vol., 8, 2637–2752 (1970).
Inorg. Nucl. Chem. Lts, vol. 4, 393–397, 1968.

*Primary Examiner*—James J. Seidleck
*Assistant Examiner*—Olga Asinovsky
*Attorney, Agent, or Firm*—Keil & Weinkauf

[57] ABSTRACT

Catalyst systems which are suitable for polymerizing ethylene and 1-alkenes comprise as active constituents A) a chromium-containing component obtainable by reducing an oxidized Phillips catalyst with organic compounds selected from the group of linear $C_4$–$C_{10}$- or cyclic $C_3$–$C_{10}$-alkenes with at least one internal C═C double bond, of 1,3-butadiene, of $C_2$–$C_{10}$-alkynes and of $C_1$–$C_{10}$-aldehydes, with or without B) an organometallic compound of the first, second, third or fourth main group or of the second subgroup of the Periodic Table of the Elements.

4 Claims, No Drawings

PHILIPS CATALYSTS REDUCED WITH ORGANIC COMPOUNDS AND POSSESSING SHORT INDUCTION TIMES

The present invention relates to catalyst systems which are suitable for polymerizing ethylene and 1-alkenes and comprise as active constituents A) a ohromium-containing component obtainable by reducing a Phillips catalyst with organic compounds selected from the group of linear $C_4$–$C_{10}$- or cyclic $C_3$–$C_{10}$-alkenes with at least one internal C=C double bond, of 1,3-butadiene, of $C_2$–$C_{10}$-alkynes and of $C_1$–$C_{10}$-aldehydes, with or without B) an organometallic compound of the first, second, third or fourth main group or of the second subgroup of the Periodic Table of the Elements.

The present invention furthermore relates to a process for preparing the catalyst systems defined at the outset by loading a porous inorganic solid with a chromium compound, oxidizing the solid obtainable in this way, and treating the oxidized solid with a reducing agent, to a process for preparing poly(1-alkenes) by polymerizing 1-alkenes in the presence of a reduced Phillips catalyst system, and to the poly(1-alkenes) obtainable by polymerizing 1-alkenes in the presence of the catalyst system defined at the outset.

Olefin polymerization catalysts based on oxidized chromium compounds which are fixed on porous solids, called Phillips catalysts, are known and are employed in particular for polymerizing ethylene or copolymerizing ethylene with 1-alkenes. The polymers are important starting materials for preparing all types of sheets and shaped articles.

Granular Phillips catalysts obtained by oxidation are generally not polymerization-active within a certain timespan, usually a few minutes, even if they are already in contact with the monomer. The polymerization starts only after an induction period, and the catalyst granules can become surrounded with a protective polymer sheath.

However, during the induction period, very many unprotected catalyst granules are crushed by the shear forces prevailing in the polymerization reactor. This catalyst abrasion leads to the polymer containing unwanted polymer fine dust.

In addition, especially in gas-phase fluidized bed reactors, it is found that the crushed catalyst is carried out of the fluidized bed into the circulating gas system and only there starts to polymerize, which in turn leads to unwanted deposits of polymer in condensers etc.

The induction period can be shortened so that the catalyst granules can be covered more quickly with a protective polymer sheath if the catalysts obtained by oxidation are reduced with carbon monoxide (Inorg. Nucl. Chem. Lett. (1968), 4, 393) or with hydrogen (J. Polym. Sci., Part A1, (1970), 8, 2637).

However, the disadvantages of both methods are that the reducing agents have to be employed in large excess, and their reaction products, carbon dioxide and water, are catalyst poisons. Furthermore, the high toxicity of carbon monoxide and the great explosiveness of hydrogen lead to considerable safety costs in industrial polymerization.

It is an object of the present invention to overcome the abovementioned disadvantages and to provide in particular catalyst systems for 1-alkene polymerization which have a short induction period and can be prepared straightforwardly.

We have found that this object is achieved by the catalyst systems defined at the outset, a process for preparing these catalyst systems, a process for preparing poly(1-alkenes) using the defined catalyst systems, and the poly(1-alkenes).

The precursor for the catalyst systems according to the invention is, as a rule, a conventional Phillips catalyst prepared by oxidation, as described, for example, in DE-A 25 40 279 or EP-A 0 429 937.

Described simply, it is generally obtained by impregnating a carrier substance with a chromium-containing solution, such as chromium(III) nitrate in water or methanol, chromium(III) acetate in water or methanol, or chromium (VI) oxide in water, evaporating the solvent and heating the solid under oxidizing conditions, for example in an oxygen-containing atmosphere, at 400 to 1000° C. This oxidation can take place in the presence of suitable fluorinating agents, for example ammonium hexafluorosilicate.

The carrier material is normally a porous inorganic solid, which may also contain hydroxyl groups. Examples of these solids which are, moreover, known to the skilled worker are alumina, silica (silica gel), titanium dioxide or mixed oxides thereof, or aluminum phosphate. Other suitable carrier materials can be obtained by modifying the pore surface with compounds of the elements boron (BE-A-861,275), aluminum (DE-A 36 35 710), silicon (EP-A 0 166 157), phosphorus (DE-A 36 35 710) or titanium (U.S. Pat. No. 4,284, 527). The carrier material can be treated under oxidizing or nonoxidizing conditions at from 200 to 1000° C., in the presence or absence of fluorinating agents such as ammonium hexafluorosilicate.

The organic compounds suitable for reducing the Phillips catalysts prepared by oxidation are linear $C_4$–$C_{10}$- or cyclic $C_3$–$C_{10}$-alkenes with at least one internal C=C double bond, 1,3-butadiene, $C_2$–$C_{10}$-alkynes or $C_1$–$C_{10}$-aldehydes.

Internal C=C double bonds are those substituted vicinally with carbon atoms.

The particular functional group which is characteristic of the group of substances can also be present several times in one molecule; this applies, for example, to dienes and polyenes. Further suitable compounds are also those having different functional groups, for example olefinically or acetylenically unsaturated aldehydes or olefinically substituted alkynes.

Furthermore, mixtures of the particular pure substances are also suitable, for example alkyne/alkene, alkene/aldehyde, alkyne/aldehyde.

Ethylene and $C_3$–$C_{10}$-1-alkenes are not suitable reducing agents for the purpose of the invention.

Very suitable alkenes are linear or branched $C_4$–$C_{10}$-alkenes with at least one internal C=C double bond, such as E- or Z-2-butene, E- or Z-2-pentene, E- or Z-2-hexene, E- or Z-3-hexene, 2,3-dimethyl-2-butene or else aromatically substituted alkenes such as E- or Z-stilbene. Also suitable are cyclic or polycyclic alkenes with 3 to 10 carbon atoms such as cyclopropene, cyclobutene, cyclopentene, cyclohexene, norbornene, and dienes, for example 2,4-hexadiene (E and Z isomers in each case), 1,4-cyclooctadiene, norbornadiene, 1,3-cyclopentadiene, 4,7-methylene-4,7,8,9-tetrahydroindene (dicyclopentadiene), 1,5,9-cyclododecatriene (E and Z isomers in each case).

The internal alkenes preferably used are 2,3-dimethyl-2-butene, cyclohexene and norbornene.

Very suitable alkynes are those with 2 to 10 carbon atoms and terminal or internal triple bonds or both, such as ethyne, propyne, 1-butyne, 2-butyne, 1-hexyne, 2-hexyne, 3-hexyne; monoalkynes are preferably used, such as propyne, 1-butyne, 1-hexyne, 2-hexyne, 3-hexyne, in particular 1-hexyne.

The aldehydes which otherwise act as catalyst poisons are also very suitable as reducing agents, such as $C_1$–$C_{10}$- aldehydes, for example formaldehyde, acetaldehyde, propionaldehyde, butyraldehyde, pentanal, hexanal, benzaldehyde, pivaldehyde. Formaldehyde is preferably used.

The reducing agent:chromium molar ratio in the Phillips catalyst to be reduced is normally in the range from 0.05:1 to 500:1, preferably 0.1:1 to 50:1, in particular 0.5:1 to 5.0:1.

The reducing agents can also be employed in any desired mixture, and the mixing ratio is generally not critical.

The Phillips catalyst can be reduced in suspension or in the gas phase.

Suitable suspending agents are $C_4$–$C_8$-alkanes such as isobutane, isopentane, n-pentane, n-hexane, n-heptane or n-octane.

Reduction in suspension is generally carried out at from 10 to 200° C., preferably from 10 to 100° C.

The pressure during the reduction of the Phillips catalyst in suspension is normally in the range from 100 to 5000 kPa, preferably in the range from 100 to 2000 kPa.

The gas phase process is very suitable for reducing Phillips catalysts, especially for preparing catalysts which can be used dry for the polymerization.

In the gas phase reduction, in general the Phillips catalyst which is to be reduced is agitated in a fluidized bed reactor with a stream of inert carrier gas, for example nitrogen or argon.

The stream of carrier gas is normally loaded with the reducing agent, and reducing agents which are liquid under standard conditions preferably have a vapor pressure under standard conditions of at least 0.1 kPa.

The reduction in the fluidized bed process is normally carried out at from 10 to 1000° C., preferably 10 to 800° C., in particular 10 to 600° C. The gas phase reduction is usually carried out under a pressure in the range from 0.1 to 5000 kPa, preferably in the range from 1 to 1000 kPa and, in particular, in the range from 50 to 200 kPa.

In preferred embodiments, the reductions in the gas phase or suspension can be carried out not just at a fixed temperature but, advantageously, in a variable temperature program.

For this purpose, the Phillips catalyst to be reduced is brought into contact with the reducing agent at low temperature, and the temperature is raised, for example linearly with heating rates of 0.5° C. to 50° C./min, preferably 1 to 10° C./min. The initial and final temperatures are normally in the range from 10 to 1000° C., preferably in the range from 10 to 800° C. and, in particular, in the range from 10 to 600° C.

Particularly favorable temperatures for the gas phase reduction of Phillips catalysts with the reducing agents according to the invention are in the range from 150 to 300° C., in particular in the range from 200 to 300° C.

The catalysts according to the invention are very suitable for polymerizing and oligomerizing 1-alkenes, preferably $C_2$–$C_{10}$-1-alkenes such as ethylene, propene, 1-butene, 1-pentene, 1-hexene, 1-heptene, 1-octene, 1-nonene or 1-decene.

It is possible, in particular, for ethylene to be homopolymerized or copolymerized with $C_3$–$C_{10}$-1-alkenes, for example with propene, 1-butene, 1-hexene, 1-octene or 1-decene or mixtures of these comonomers, the mixing ratio not being critical.

The chemically bonded comonomer content of the ethylene/1-alkene copolymers measured by the $^{13}$C-NMR spectroscopic method (J. Macromol. Sci., Rev. Macromol. Chem. Phys. (1989) C29 (2/3)) is normally in the range from 0.1 to 2 mol % of units derived from 1-alkene.

The melt flow index of the poly(1-alkenes), measured by the DIN 53735 method at 190° C., loading weight 21.6 kg, is generally from 0.1 to 40 g/10 min, preferably 2 to 25 g/10 min.

Polymers obtainable with the catalyst system according to the invention have higher average molecular weights Mw than polymers obtainable with conventional Phillips catalysts or with Phillips catalysts reduced with carbon monoxide. They are for the polymers according to the invention generally in the range from 200,000 to 5,000,000 measured by the gel permeation chromatography (GPC) method at 135° C. in 1,2,4-trichlorobenzene (polyethylene standard).

The molecular weight distribution Mw/Mn of the polymers according to the invention, measured by the GPC method as described above, is normally in the range from 7 to 100.

The 1-alkenes can be polymerized, continuously or batchwise, in conventional processes known for olefin polymerization, such as solution processes, suspension processes, agitated gas phase or gas phase fluidized bed processes. Solvents or suspending agents which can be used are inert hydrocarbons such as isobutane, or else the monomers themselves.

The pressure is generally from 100 to 10000 kPa, preferably 1000 to 6000 kPa, and the temperature is generally in the range from 10 to 150° C., preferably in the range from 30 to 125° C.

Particularly suitable processes for preparing the polymers according to the invention are the suspension process and the gas phase fluidized bed process.

It is possible and advantageous to employ hydrogen as regulator in the polymerization to control the molecular weights. It has proven advantageous to carry out the polymerization of the 1-alkenes with the reduced catalysts according to the invention in the presence of organometallic compounds of the first, second, third or fourth main group or of the second subgroup of the Periodic Table of the Elements. Very suitable compounds of this type are homoleptic $C_1$–$C_{10}$-alkyls of lithium, boron, aluminum or zinc, such as n-butyllithium, triethylboron, triethylaluminum, triisobutylaluminum, trihexylaluminum, trioctylaluminum and diethylzinc. Also very suitable are $C_1$–$C_{10}$-dialkylaluminum alkoxides such as diethylaluminum ethoxide. n-Butyllithium is particularly preferred as organometallic compound. Mixtures of the organometallic compounds described above are also generally very suitable, the mixing ratio not being critical.

The organometallic compound:chromium molar ratio is normally in the range from 0.1:1 to 50:1, preferably in the range from 1:1 to 50:1.

The catalyst systems according to the invention have a short induction period in the polymerization of 1-alkenes. It was not to be expected that the reducing agents according to the invention, which are otherwise known rather as catalyst poisons, would provide catalyst systems with good properties.

The polymers of 1-alkenes obtainable using the catalyst systems according to the invention generally have high molecular weights Mw. They can be further processed advantageously to sheets and shaped articles.

EXAMPLES

The polymerizations described in the following examples were carried out with a Phillips catalyst which was prepared by the method described in DE-A 25 40 279, especially the example. The catalyst was activated in air at 750° C. and then reduced with the particular reducing agents (see tables).

Examples 1, 2 and Comparative Example C1

Homopolymerization of 1-hexene with catalysts previously reduced in suspension.

To polymerize 1-hexene, in each case 5 g of Phillips catalyst were suspended in 100 ml of dry heptane. After heating to 90° C., the particular reducing agent was added in the molar ratio of 1:1 based on the chromium content of the catalyst, and stirring was continued for 1 h. Finally, in each case 20 ml of 1-hexene were added to the reactor, and the polymerization was carried out at 90° C. The polymerization was stopped after 10 minutes by adding methanol. The catalyst was removed by filtration, the filtrate was concentrated under reduced pressure, and the polymer yield was determined by weighing the residue on evaporation. (See Table 1 for results). C1 was carried out with a Phillips catalyst which was not previously reduced.

TABLE 1

Suspension reduction and 1-hexene polymerization

| Example | Reducing agent (ml/mmol) | Conversion (%) of 1-hexene into poly(1-hexene) after 10 minutes |
|---|---|---|
| 1 | Cyclohexene (0.10/1) | 33.4 |
| 2 | Norbornene (0.09/1) | 48.2 |
| C1 | — | 30.4 |

Examples 3 to 7

Polymerization of 1-hexene with Phillips catalysts previously reduced in the gas phase.

The Phillips catalysts were reduced in a fluidized bed reactor. Initially 20 g of the catalyst which had been prepared by oxidation were agitated in a stream of argon. Then the reducing agent was mixed, in the molar ratio of 1:1 based on the chromium content of the catalyst, into the main stream via a second stream of argon and agitated with the catalyst at 23° C. for 15 min. The catalysts were then heated over the course of 10 minutes to the temperatures indicated in Table 2. The catalysts were left at these temperatures in the agitating stream of argon for 1 hour.

The catalysts obtainable in this way were then employed as in Example 1 to polymerize 1-hexene (see Table 2).

TABLE 2

Gas phase reduction and 1-hexene polymerization

| Example | Reducing Agent (g, mmol) | Heating temperature (° C.) | Conversion (% by weight) of 1-hexene to poly(1-hexene) |
|---|---|---|---|
| 3 | Norbornene (0.36/3.8) | 200 | 62.3 |
| 4 | Cyclohexene (0.31/3.8) | 200 | 70.5 |
| 5 | 2,3-Dimethyl-2-butene (0.34/3.8) | 200 | 51.9 |
| 6 | 1-Hexyne (0.31/3.8) | 200 | 51.1 |
| 7a) | Formaldehyde (0.44/14.7) | 300 | 63.8 | a)Chromium: formaldehyde = 1:4

Examples 3 to 7 show that the catalysts previously reduced in the gas phase have a higher productivity than the catalyst not previously reduced from Comparative Example C1. It is evident from Examples 6 and 7 that active catalysts can even be obtained with alkynes or formaldehydes, which are generally regarded as catalyst poisons.

The conversion of 1-hexene to poly(1-hexene) in % by weight indicated in the table correlates with the catalyst productivity (conversion per unit time) and with the induction period of the catalysts. A short induction period means a high conversion and vice versa.

Examples 8 to 11 and Comparative Example C2

Polymerization of ethylene with Phillips catalysts reduced in the gas phase.

The catalysts were reduced by the process described in Examples 4 and 7.

500 ml of isobutane and 20 ml (20 mmol) of n-butyllithium 1 M in hexane were introduced into a 1 l steel autoclave and heated to 90° C., and ethylene was metered in until the total pressure was finally 4000 kPa. In some tests, hydrogen was metered in with an initial partial pressure of 300 kPa.

Then 100 mg of the reduced Phillips catalyst were metered in, and polymerization was carried out for 90 minutes. After the pressure in the autoclave had been reduced to ambient pressure, the polymer was isolated.

The induction time indicated in Table 3 means the time from metering the catalyst into the polymerization autoclave to the time after which the first two liters (STP) of ethylene had been consumed in the autoclave.

P/C is the productivity of the catalyst based on the amount of isolated polymer/amount of reduced Phillips catalyst in g.

TABLE 3

Gas phase reduction and ethylene polymerization

| Example | Reducing agent | $H_2$ partial pressure (kPa) | Induction time (min) | P/C (g/g) | $M_w$ | $M_n$ |
|---|---|---|---|---|---|---|
| 8 | Cyclohexene | 3.0 | 11 | 2267 | — | — |
| 9 | Cyclohexene | — | 12 | 2250 | 821,255 | 32,503 |
| 10 | Formaldehyde | — | 14 | 1262 | 804,134 | 25,463 |
| 11 | Formaldehyde | 3.0 | 10 | 1603 | — | — |
| C2 | CO | 3.0 | 20 | 1201 | 384,299 | 33,539 |

The examples show that the induction periods to the initial ethylene uptake have been shortened with the catalysts of Examples 8 to 11 which have been reduced according to the invention compared with Comparative Example C2. It is additionally shown that the polyethylene from the tests in Examples 9 and 10 has higher molecular weights Mw than the polyethylene from Comparative Example C2.

What is claimed is:

1. A process for preparing a catalyst system by
   a) loading a porous inorganic solid with a chromium compound,
   b) oxidizing the solid obtained in step a) and
   c) previously to polymerizing ethylene and 1-alkenes with said catalyst system treating the oxidized solid with a reducing agent previously to the polymerization,
   d) where appropriate adding an organometallic compound of the first, second, third or fourth main group or of the second subgroup of the Periodic Table of the Elements, wherein organic compounds selected from the group consisting of linear $C_4$–$C_{10}$- or cyclic $C_3$–$C_{10}$-alkenes having at least one internal C=C double bond, 1,3-butadiene, $C_2$–$C_{10}$-alkynes and $C_1$–$C_{10}$-aldehydes are used as reducing agents.

2. A process for preparing a catalyst system as claimed in claim 1, wherein organic compounds selected from the group consisting of linear $C_4$–$C_{10}$- or cyclic $C_3$–$C_{10}$-monoalkenes having internal C=C double bond, $C_2$–$C_{10}$-monoalkynes and $C_1$–$C_{10}$-monoaldehydes are used as reducing agents.

3. A process for polymerizing ethylene and 1-alkenes in the presence of a reduced Phillips catalyst system, wherein the reduced Phillips catalyst system used is prepared as claimed in claim 1.

4. A process for polymerizing ethylene and 1-alkenes in the presence of a reduced Phillips catalyst system, wherein the reduced Phillips catalyst system used is prepared as claimed in claim 2.

* * * * *